United States Patent
Komorowski et al.

(10) Patent No.: US 7,942,770 B2
(45) Date of Patent: May 17, 2011

(54) COMPOUND CHAIN DRIVE GUIDE

(75) Inventors: Jacek S. Komorowski, Bond Head (CA); Witold Gajewski, Richmond Hill (CA)

(73) Assignee: Litens Automotive Partnership, Woodbridge (CA)

(*) Notice: Subject to any disclaimer, the term of this patent is extended or adjusted under 35 U.S.C. 154(b) by 366 days.

(21) Appl. No.: 11/659,647

(22) PCT Filed: Aug. 10, 2005

(86) PCT No.: PCT/CA2005/001229
§ 371 (c)(1),
(2), (4) Date: Feb. 7, 2007

(87) PCT Pub. No.: WO2006/015483
PCT Pub. Date: Feb. 16, 2006

(65) Prior Publication Data
US 2008/0081717 A1 Apr. 3, 2008

Related U.S. Application Data

(60) Provisional application No. 60/601,251, filed on Aug. 13, 2004.

(51) Int. Cl.
*F16H 7/08* (2006.01)
(52) U.S. Cl. .................. 474/110; 474/111; 474/140
(58) Field of Classification Search .............. 474/110, 474/140, 113, 136, 133, 117
See application file for complete search history.

(56) References Cited

U.S. PATENT DOCUMENTS

| | | | | |
|---|---|---|---|---|
| 2,051,488 A | * | 8/1936 | Dreyer et al. | 474/110 |
| 3,142,193 A | * | 7/1964 | Polko et al. | 474/110 |
| 4,094,205 A | * | 6/1978 | Cook | 74/731.1 |
| 4,674,996 A | * | 6/1987 | Anno et al. | 474/110 |
| 4,792,322 A | | 12/1988 | Goppelt et al. | |
| 5,030,169 A | | 7/1991 | Kiso et al. | |
| 5,207,620 A | | 5/1993 | Yamamoto et al. | |
| 5,702,315 A | * | 12/1997 | Sakai et al. | 474/94 |
| 5,908,363 A | | 6/1999 | Suzuki | |

(Continued)

FOREIGN PATENT DOCUMENTS

CA 2 246 200 4/1999

(Continued)

OTHER PUBLICATIONS

Pictorial Handbook of Mechanical Devices; Grafstein et al., 1971; pp. 42,43; Figs. a-d.
International Search Report & Written Opinion for PCT/CA2005/001229 Dated Dec. 21, 2005.

*Primary Examiner* — Robert A Siconolfi
*Assistant Examiner* — Anna Momper

(57) ABSTRACT

A tensioner assembly for a drive system, including a chain, of an internal combustion engine, includes a housing that is fixedly secured to the internal combustion engine. A piston is disposed within the housing. The piston is moveable between retracted and extended positions. The piston generates a force. A pivoting guide operatively extends between the chain of the drive system and the piston. The pivoting guide applies a first portion of the force against the chain. A lever is operatively connected to the piston between the piston and the pivoting guide. The lever translates the force from the piston to the pivoting guide. The tensioner assembly also includes a cam member that is pivotally coupled to the housing and is slidingly engaged with the pivoting guide. The cam member abuts the lever such that movement of the lever by the piston pivots the cam member in a manner that applies a second portion of the force against the pivoting guide in a varying magnitude.

17 Claims, 9 Drawing Sheets

U.S. PATENT DOCUMENTS

| | | |
|---|---|---|
| 5,931,754 A | 8/1999 | Stief et al. |
| 6,431,133 B2 | 8/2002 | Brandl et al. |
| 2002/0022541 A1* | 2/2002 | Ullein et al. ............ 474/110 |
| 2002/0039942 A1* | 4/2002 | Liu et al. ................ 474/133 |
| 2002/0065159 A1* | 5/2002 | Markley ................. 474/110 |
| 2002/0160868 A1 | 10/2002 | Wigsten et al. |

FOREIGN PATENT DOCUMENTS

| | | |
|---|---|---|
| JP | 08004850 A * | 1/1996 |
| WO | 02073066 A2 | 9/2002 |

* cited by examiner

COMPOUND CHAIN DRIVE GUIDE

This application claims the benefit of U.S. Provisional Patent Application having Ser. No. 60/601,251, filed on Aug. 13, 2004.

FIELD OF THE INVENTION

The present invention relates generally to tensioners, and more particularly, to timing tensioners that produce tension forces of varying magnitude.

DESCRIPTION OF THE RELATED ART

Typical chain or belt systems (hereinafter collectively referred to as "chain systems") are known in the art for use in automotive applications. These chain systems include tensioners that apply a uniform load to a slack side of the chain or belt, which maintains the tension of the chain or belt above a minimum value required to drive various components attached to the belt system. Additionally, tensioners are used in non-synchronized drive systems to prevent slippage and power transmission loss. And finally, tensioners are commonly utilized in accessory drive systems, and timing chain or belt systems of an automobile.

In a typical timing chain or belt system as illustrated in FIG. 6, a guide 116 is in contact with an endless drive element 120, such as a chain or belt, along a running surface. An actuator 118 engages the guide 116, and adjusts the position of the guide 116 to vary the tension in the chain 120. Generally, the guide 116 is pivotally attached to the engine and a hydraulic actuator 118 engages the guide 116 to angularly displace the guide 116 about the pivot point 130. The hydraulic actuator 118 includes a spring 119 to assist in maintaining the guide 116 in engagement with the chain 120. As the guide 116 travels through its range of motion, the applied force to the chain 120 diminishes, primarily as a result of reduced spring force, as the guide 116 moves in a chain engaging direction. Typically, the range of applied forces can vary from a low and high value difference at various positions in a significant amount. Such a wide range of applied forces results in varying tensions within the chain.

At the high value of applied force, the chain has a high tension that may lead to chain stretch over time, as well as increased frictional wear on various components of a timing chain system, such as the bearings of a crank or camshaft.

Also, increased noise, vibration and harshness (NVH) are observed when the chain is under a high tension. At a low value of applied force the chain may flutter resulting in timing errors between the crankshaft and camshaft. This will unduly wear various components.

Increased NVH may also be observed at a low value of applied force to the chain. It is desirable to limit the range between high and low values of applied forces to maintain a desired tension in the chain, thereby limiting the problems outlined above.

There is therefore a need in the art for a tensioner and guide for a timing chain system that narrows the range of applied forces to the chain. Additionally, there is a need in the art for a timing chain system meeting the needs outlined above and also does not require significant alterations to an engine layout to implement the system.

SUMMARY OF THE INVENTION

It is an object of the present invention to provide a novel tensioner assembly that obviates or mitigates at least on disadvantage of the prior art.

It is desirable to provide a tensioner assembly for a drive system, including an endless drive element such as a chain or belt, of an internal combustion engine, that provides an increasing applied force to the drive system to maintain relatively constant tension in the endless drive element over the life of the endless drive element.

According to one aspect of the invention, there is provided a tensioner assembly for a drive system, including an endless drive element such as a chain or belt, of an internal combustion engine, that includes a hydraulic actuator, which actuator is fixedly secured to the internal combustion engine. The hydraulic actuator includes a piston that is moveable between retracted and extended positions. The piston generates a force. A pivoting guide operatively extends between the chain of the drive system and the piston. The pivoting guide applies a first portion of the force against the chain. A lever is operatively connected to the piston between the piston and the pivoting guide. The lever translates the force from the piston to the pivoting guide. The tensioner assembly also includes a cam member that is pivotally coupled to the housing and is slidingly engaged with the pivoting guide. The cam member abuts the lever such that movement of the lever by the piston pivots the cam member in a manner that applies a second portion of the force against the pivoting guide, whereby as the guide pivots in a tensioning direction, the force increases, thereby maintaining a generally uniform tension in the endless drive element.

According to another aspect of the invention, there is provided a tensioner assembly including a hydraulic actuator operatively mountable to an engine. The hydraulic actuator has a piston moveable-between retracted and extended-positions in response to oil pressure of the engine, and a spring urging the piston towards the extended position. A guide has a first end pivotally mountable to the engine and a second end distal from the first end. The piston operatively engages the second end of the guide to torque the guide into engagement with the endless drive element and maintain tension therein. A biasing assembly engages the guide and cooperates with the hydraulic actuator to apply a force to the guide, effecting an increasing torque, as the piston moves towards the extended position thereby maintaining a generally uniform tension in the endless drive element.

According to another aspect of the invention, there is provided a biasing assembly for the tensioner assembly that includes a lever pivotally connected to the guide and engaging the piston and a pivotally mounted cam. The cam slidingly engages with the guide, and pivotally engages with the lever. As the piston moves from the retracted position to the extended position, the lever primarily urges the guide in an engaging direction and pivots the cam to secondarily urge the guide in a chain engaging direction.

According to another aspect of the invention, there is provided a biasing assembly for the tensioner assembly that includes a spring, and a cap on each end of the spring. The caps pivotally mount the spring to the second end of said guide. The spring generates a spring force that initially is directed to act against an actuator force generated by the hydraulic actuator. As the piston moves to the extended position, the spring rotates directing the spring force to act in conjunction with the actuator force.

BRIEF DESCRIPTION OF THE DRAWINGS

Preferred embodiments of the present invention will now be described, by way of example only, with reference to the attached Figures, wherein.

DETAILED DESCRIPTION OF THE PREFERRED EMBODIMENT

Figure 1:
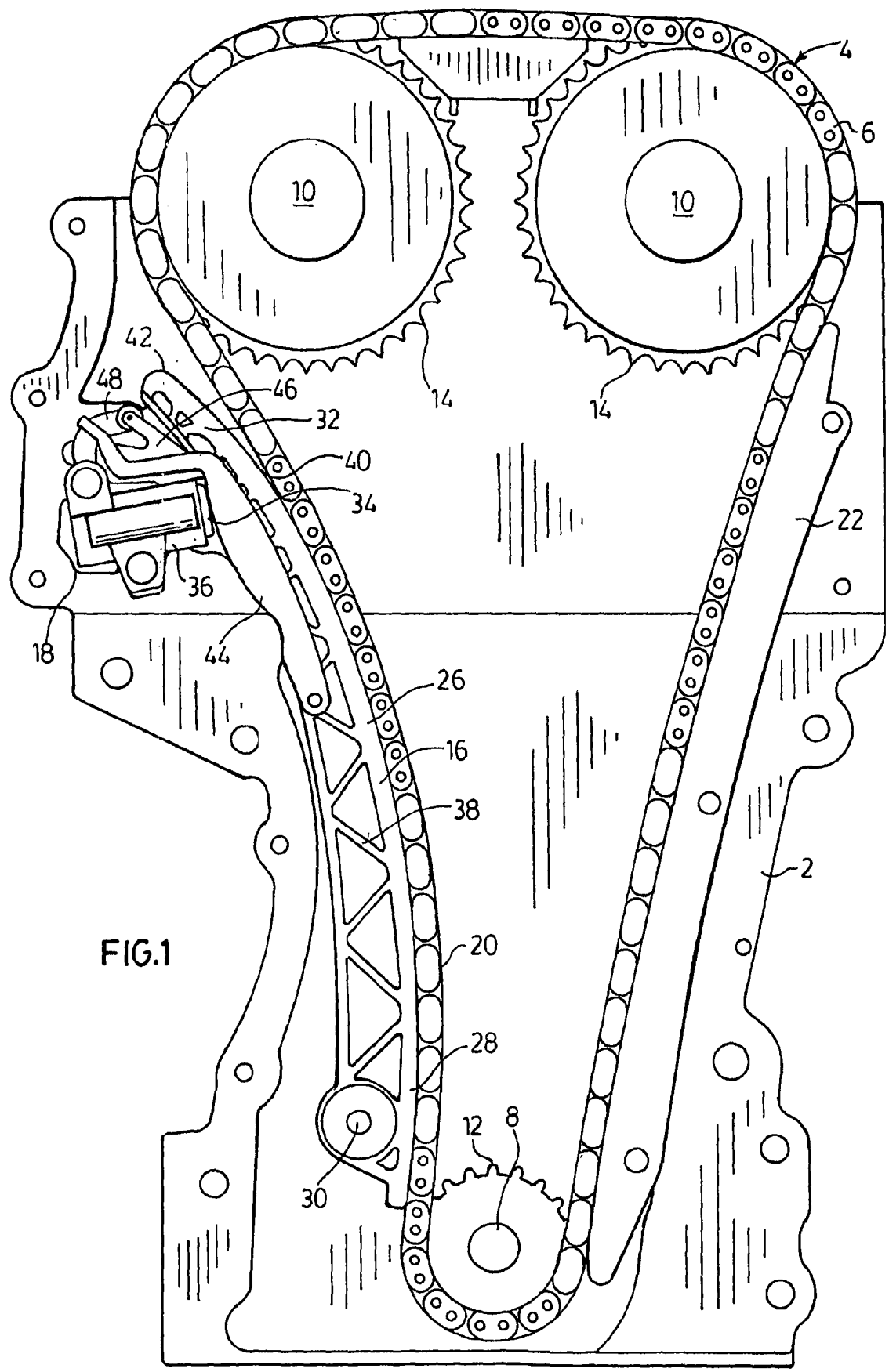
FIG. 1 is a sectional side view of a timing system and engine including the tensioner assembly and pivoting guide of the present invention.

Referring to FIG. 1, a portion of an internal combustion engine 2 and its associated drive system 4 are shown. The drive system 4 includes an endless drive element, such as a chain 6 linking a crankshaft 8 to camshafts 10. Although the pictured embodiment details a chain 6, it is to be understood that other endless drive elements, including a belt, may also be utilized by the present invention.

The chain 6 engages rotatable elements or sprockets 12, 14 associated with the crankshaft 8 and camshafts 10, respectively. The chain 6 transfers rotation from the crankshaft 8 to the camshafts 10. The chain 6 is disposed in a circuitous path about the sprockets 12, 14 with a pivoting guide 16 and tensioner assembly, generally indicated at 18, positioned on a slack side 20 of the chain 6, relative to the crankshaft 8, and a fixed guide 22 positioned on a tight side 24 of the chain 6.

The tensioner assembly 18 applies a force to the chain 6, through the pivoting guide 16, for adjusting and maintaining a tension within the chain 6.

The pivoting guide 16 includes an arcuate guide surface 26 including a first end 28 that is pivotally attached to the internal combustion engine 2 about a pivot point 30 and a second end 32 spaced from the first end 28. Alternatively, the pivoting guide 16 may include a series of roller members replacing the arcuate guide surface 26.

The tensioner assembly 18 is attached to the internal combustion engine 2 at a position toward the second end 32 of the pivoting guide 16.

The tensioner assembly 18 includes a hydraulic actuator 36, which is fixedly secured to the internal combustion engine 2. Hydraulic actuator 36 includes a sliding piston 34 and a compression spring 35, (see FIG. 7) as is conventional in the art. In a preferred aspect of the present invention, the tensioner assembly 18 includes a hydraulic actuator 36, although pneumatic and other actuators may be utilized by the present invention.

Figure 3:
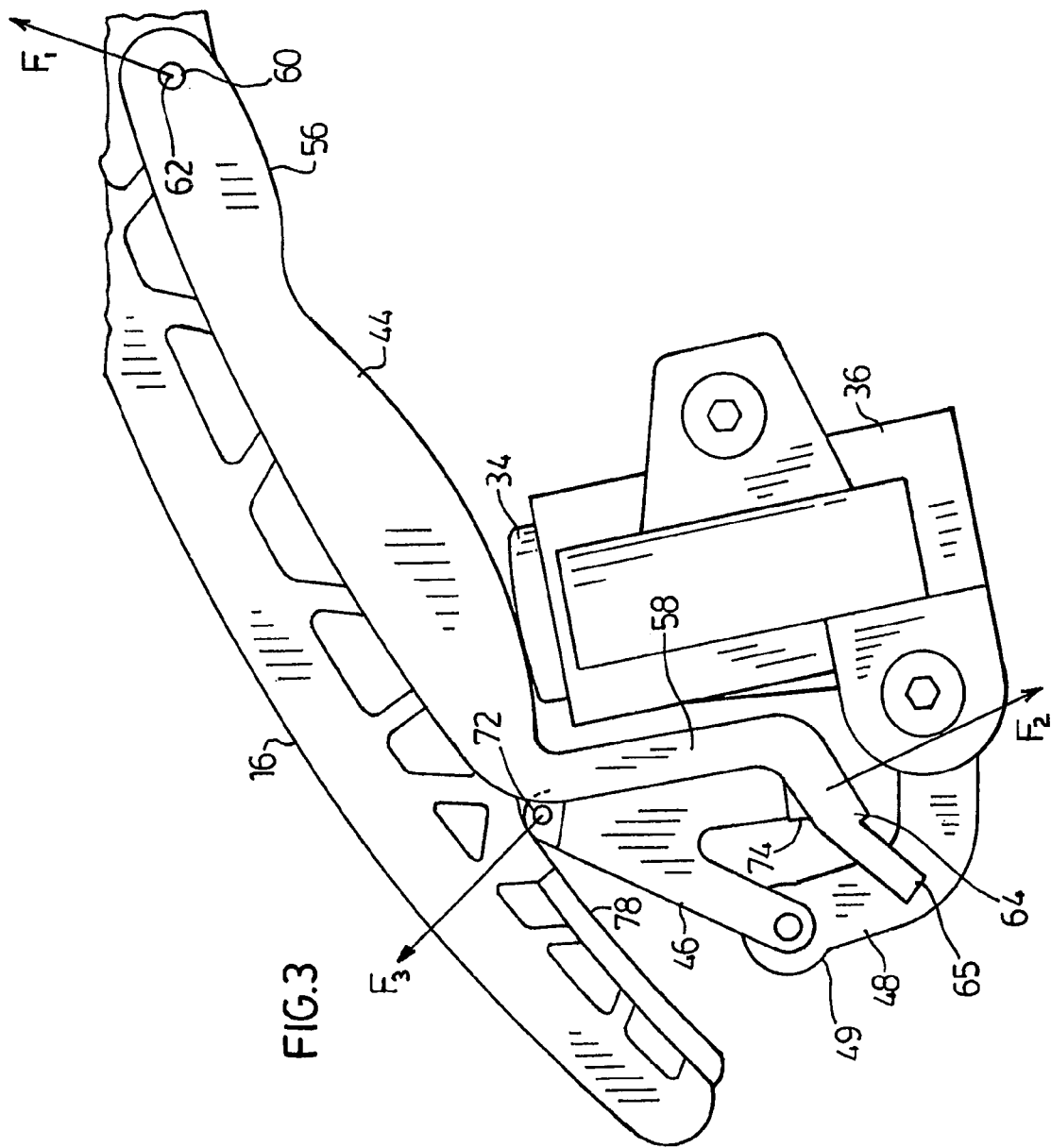
FIG. 3 is a side view of the tensioner assembly and guide of the present invention with the piston in the retracted position.
Figure 4:
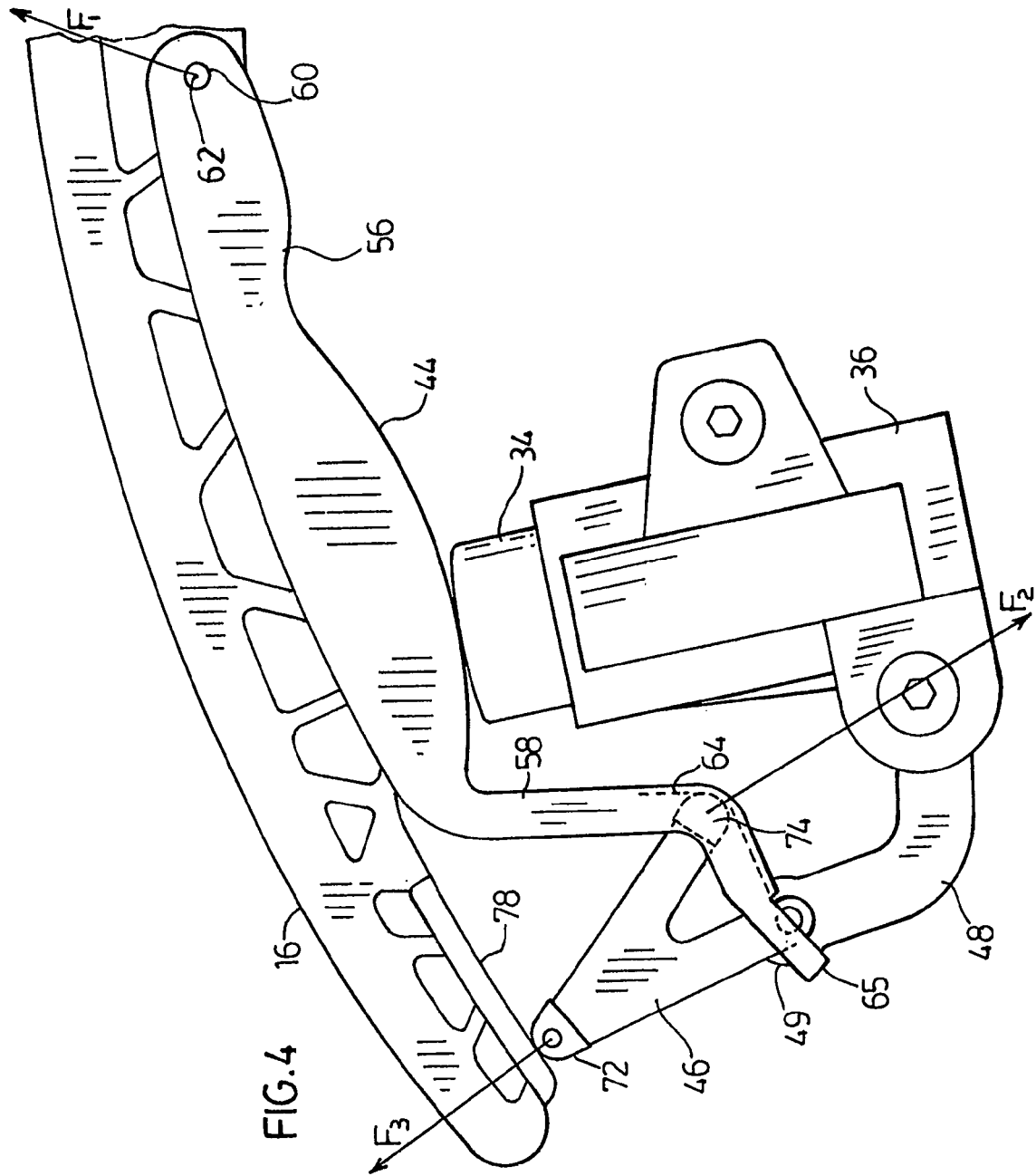
FIG. 4 is a side view of the tensioner assembly and pivoting guide of the present invention with the piston in the extended position.

The piston 34 is operatively connected to the engine oil supply of the engine 2. Engine oil is delivered under pressure to the hydraulic actuator 36, which causes movement of the piston 34 with respect to the housing of hydraulic actuator 36. The piston 34 is preferably bi-directional, meaning that the piston 34 is moveable between a retracted position, as shown in FIG. 3 and an extended position, as shown in FIG. 4.

Figure 2:
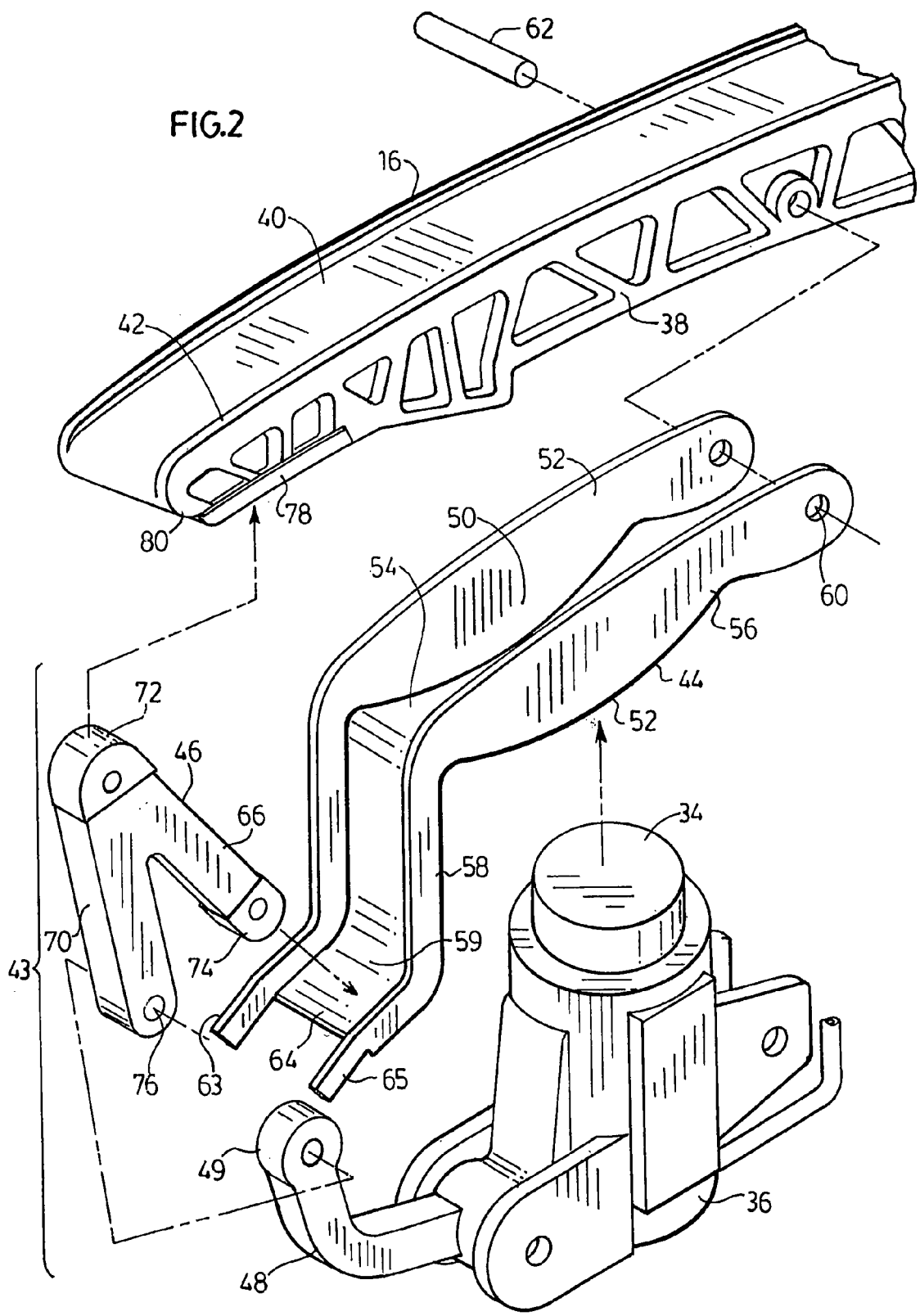
FIG. 2 is an exploded perspective view of the tensioner assembly and pivoting guide of the present invention.

Referring to FIG. 2, the housing of hydraulic actuator 36 has a connection member 48 projecting radially outward therefrom defining a distal end 49.

The guide 16 includes a structural portion 38 supporting the arcuate guide surface 26. Arcuate, guide surface includes a chain engaging portion 40 disposed between side flanges 42 extending from the structural portion 38. Chain engaging portion 40 may include a wear resistant material for resisting frictional wear due to constant engagement with the chain 6.

Guide 16 has a sliding surface 78 on the underside of structural portion 38 that receives the cam 46. Sliding surface 78 may be planar or have a contour or shape that can be utilized to further manipulate force distribution between the cam 46 and the sliding surface, 78.

The tensioner assembly 18 includes a biasing assembly 43. Biasing assembly 43 comprises a lever 44 and cam 46.

The lever 44 is generally S-shaped and includes a trough 50 defined by generally parallel sides 52 and a bottom 54. The lever 44 includes a first portion 56 proximate the first end 28 of the pivoting guide 16 and a second portion 58 angularly displaced relative to the first portion 56. The first portion 56 of the lever 44 includes aligned holes 60 formed through the sides 52 of the trough 50 for pivotally attaching the lever 44 to the movable guide 16 using a guide pin 62.

The second portion 58 of the lever 44 is generally L-shaped that defines a bight 59 and terminates at a cam engaging portion 64. The cam engaging portion 64 includes side extensions 63, 65. The side extensions 63, 65 overlap the connection member 48 to maintain a proper alignment of the lever 44 with respect to the pivoting guide 16 and the piston 34.

The piston 34 engages the bottom 54 of the lever 44 to pivot the pivoting guide 16 about the pivot point 30.

While the embodiment of the lever 44 shown in the Figures is pivotally attached at the first portion 56 to the pivoting guide 16, the first portion 56 of the lever 44 may alternatively be pivotally attached to the internal combustion engine 2.

The cam 46 is preferably V-shaped having two legs 68, 70 meeting at a vertex 72. First leg 68 of the cam 46 terminates at a lever engaging portion 74 that is nested within bight 59 of cam engaging portion 64 of the lever 44 between the two sides 52. Lever engaging portion 74 pivots relative to the lever 44.

The second leg 70 of the cam 46 terminates at a second leg hole 76 for pivotally attaching to the distal end 49 of the connection member 48 of the housing of the hydraulic actuator 36.

The vertex 72 of the cam 46 engages a sliding surface 78 This abutting engagement of the vertex 72. with the sliding surface 78 affects the movement of the pivoting guide 16. Additionally, the vertex 72 of the cam 46 may be shaped or replaced with a roller type bearing to engage the pivoting guide 16.

Figure 6:
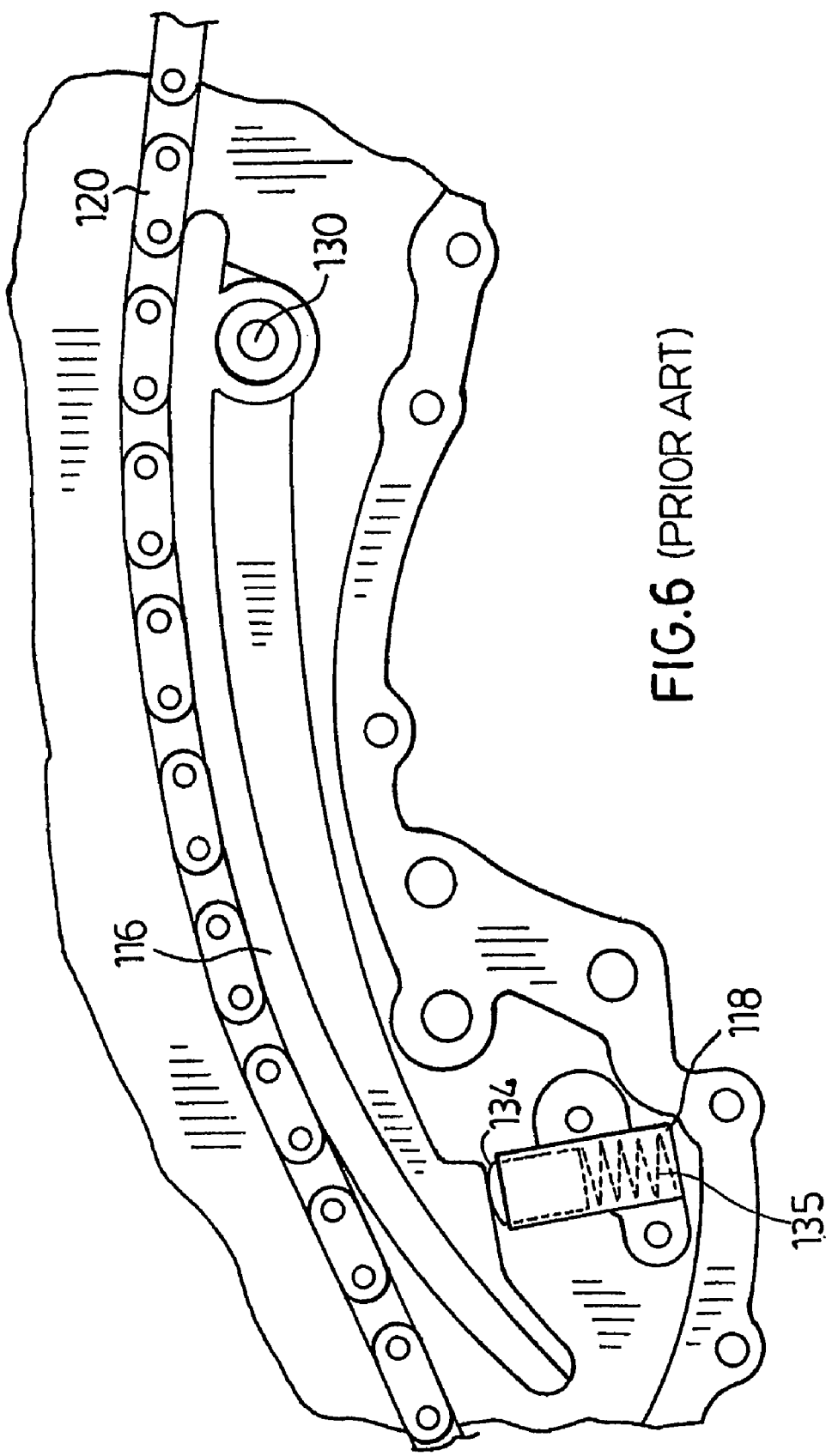
FIG. 6 is a partial side view of a prior art tensioner assembly and guide.

A comparison of a prior art tensioner 118 of FIG. 6 and the tensioner assembly 18 of the present invention shown in FIG. 1, indicates that the tensioner assembly 18 may be easily retrofitted to prior art systems. The tensioner assembly 18 fits in the space occupied by the prior art tensioner 118. This characteristic is commercially desirable, as an internal combustion engine layout does not need to be altered to accommodate the tensioner assembly 18 of the present invention.

In operation, the hydraulic actuator 36 receives oil under pressure from the engine. The piston 34 converts the pressure to a force that is transmitted to the lever 44. During the life of the drive system, the endless drive element 6 will stretch, allowing the piston 34 to move from the retracted position, shown in FIG. 3 to the extended position, shown in FIG. 4. As the piston 34 extends, the force generated from the oil pressure remains constant. However, the force from the spring diminishes thereby reducing the total force available.

The lever 44 translates a portion of that force, represented by the vector F1 in FIGS. 3 and 4, to the pivoting guide 16 through the guide pin 62. The lever 44 also transmits a second portion of the force, through the cam 46, represented by the vector F2 at the vertex 72 thereof.

Forces F1 and F3 are opposed by force F2 that extends in a generally opposite direction having an origin at the interface between the lever engaging portion 74 and the cam engaging portion 64 of the lever 44.

As the piston 34 travels from the retracted position in FIG. 3 to the extended position in FIG. 4, the magnitude of the F3 vector increases, as represented by the increased length of F3 in FIG. 4, compared to the length in FIG. 3.

The varying magnitude is attributed to movement of the cam 46 about the connection member 48 and along the sliding surface 78 of the pivoting guide 16 as the piston 34 extends. The mechanical advantage of the cam 46, in relation to the pivoting guide 16, increases as the piston 34 extends, thereby increasing the magnitude of F3. More importantly, the effect of the increasing magnitude of F3 is amplified since F3 is applied to the pivoting guide 16 at a point further out from the pivot point 30 and thereby has a larger moment arm as compared with force F1. Thus the torque available that can be applied to the endless drive element 6 starts at a minimum level and increases as the endless drive element 6 wears and stretches.

The variation of the magnitude of the F3 may also be described as a ratio of the F3 and F2 vectors. The ratio of the vectors F3 and F2 changes as the piston 34 extends and retracts. As the piston 34 extends the ratio of F3 to F2 approaches a more 1 to 1 relationship as denoted by the similar lengths of the F3 and F2 vectors in FIG. 4.

Figure 5:
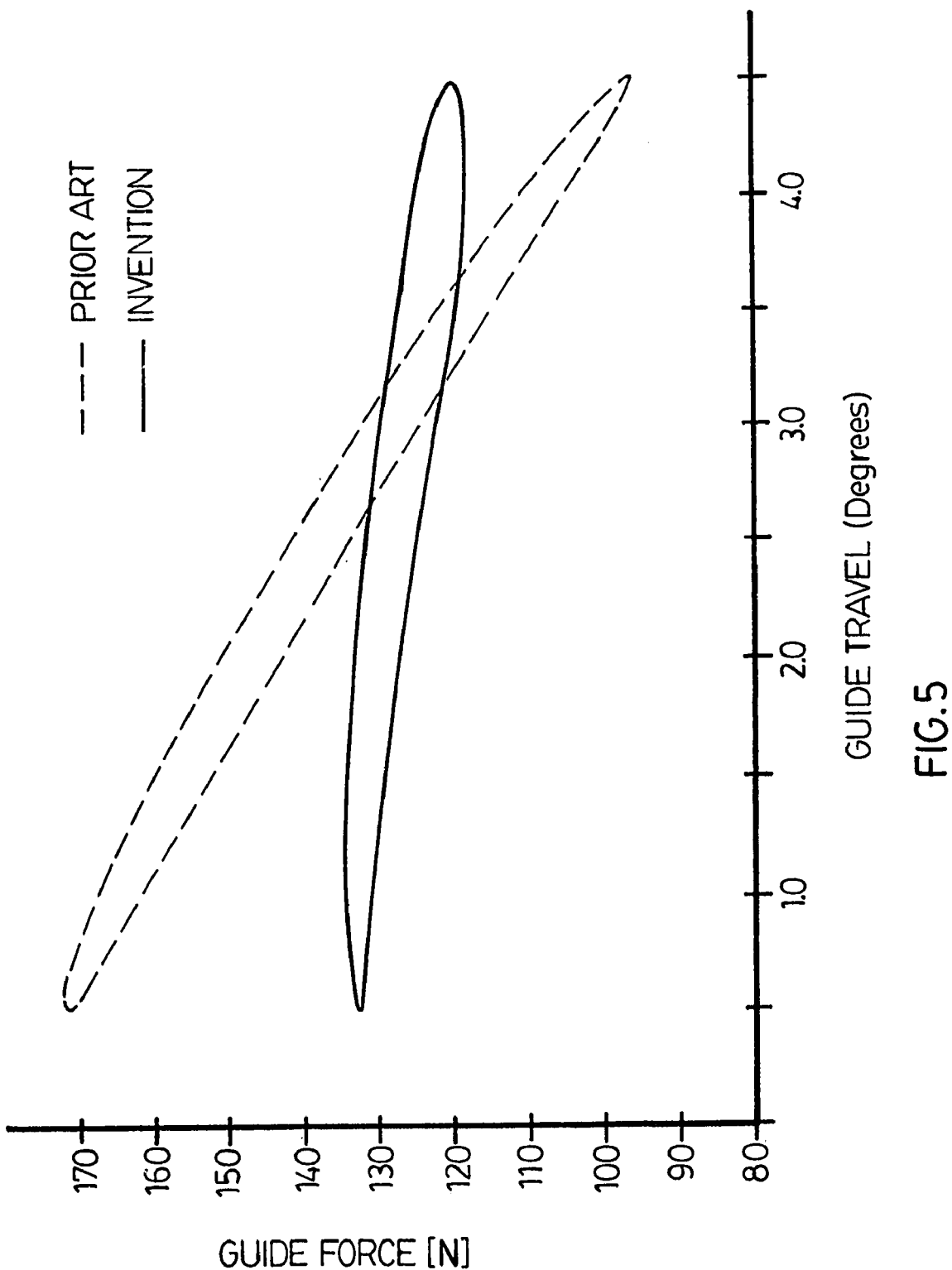
FIG. 5 is a force diagram of a prior art guide and the guide of the present invention with the force in Newtons applied to the guide plotted as a function of the position of the guide.

Referring to FIG. 5, there is shown a diagram of the force applied to a guide as a function of position for the tensioner assembly 18 and pivoting guide 16 of the present invention (solid line) and a prior art tensioner 118 and guide 116 (dashed line), shown in FIG. 6.

It can be seen that the slope of the prior art force curve is much greater. In other words, there is greater variation of the force applied to the guide 116 as the position changes, than the tensioner assembly 18 and pivoting guide 16 of the present invention. The lessening in variation of the force of the present invention allows for a reduction in the force applied to the pivoting guide 16 at an upper limit and also an increase in the force applied to the pivoting guide 16 at a lower limit. The decreased variation of force applied to the pivoting guide 16 allows the tension within the chain 6 to be maintained in a more uniform state, reducing wear on components, as well as reducing noise generated by the drive system 4.

Figure 7:
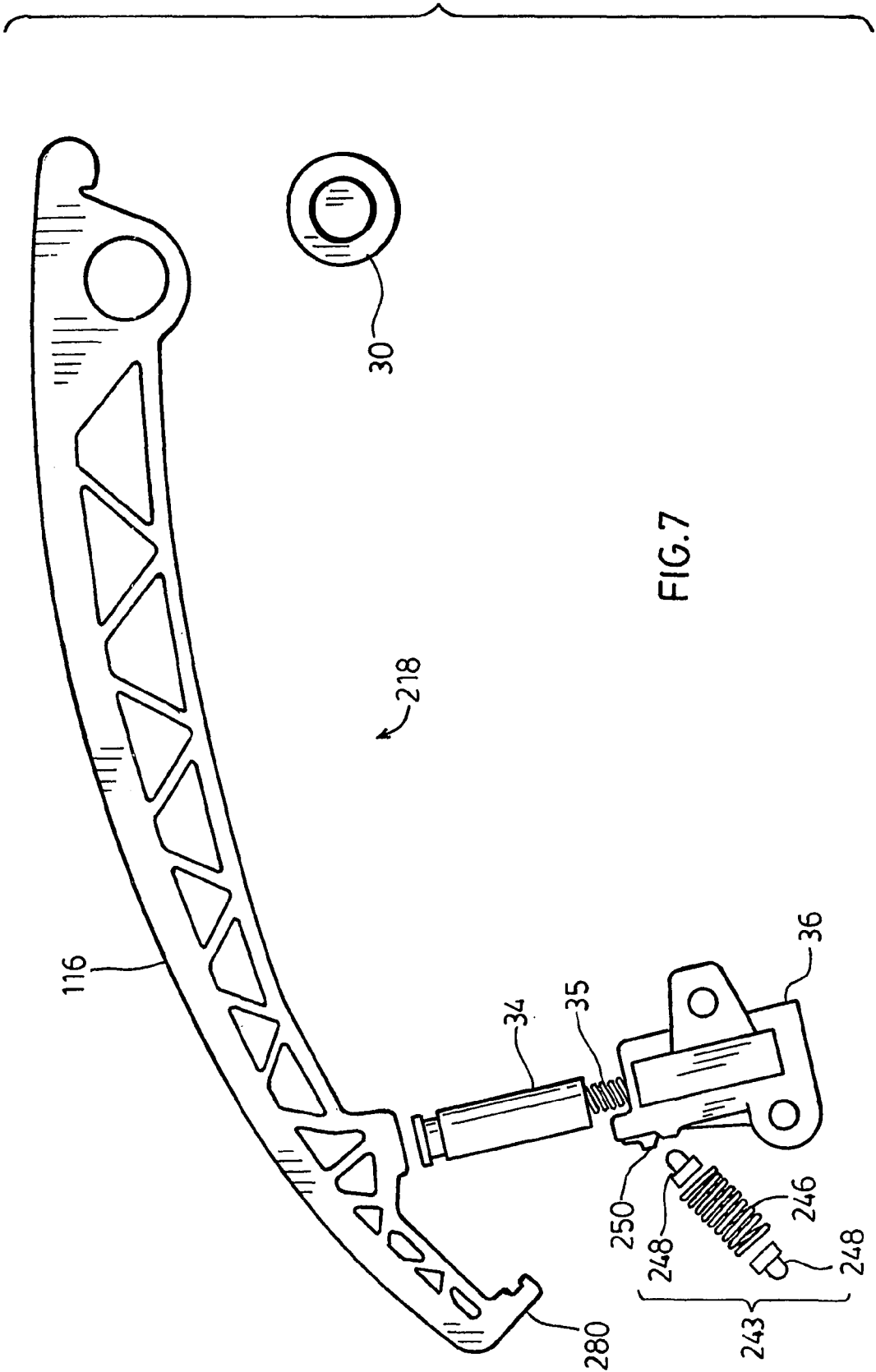
FIG. 7 is an exploded view of a second embodiment of the present invention.

Referring to FIG. 7, a second embodiment of the tensioner assembly 218 of the present invention is illustrated. In this embodiment the biasing assembly 243 generally comprises a compression spring 246 and a pair of caps 248.

Caps 248 each has an arcuate end extending from a cylindrical portion. The cylindrical portion frictionally engages within the inside diameter of the spring 246.

The pivoting guide 16 is the same as the conventional prior art guide 116 with the exception that a hook structure 280 is formed on the second distal end of the guide. The hook structure 280 pivotally receives one of the caps 248.

The hydraulic actuator 36 is the same as the first embodiment, except that the housing has a pivot structure 250 that receives the other of the caps 248.

Figure 8:
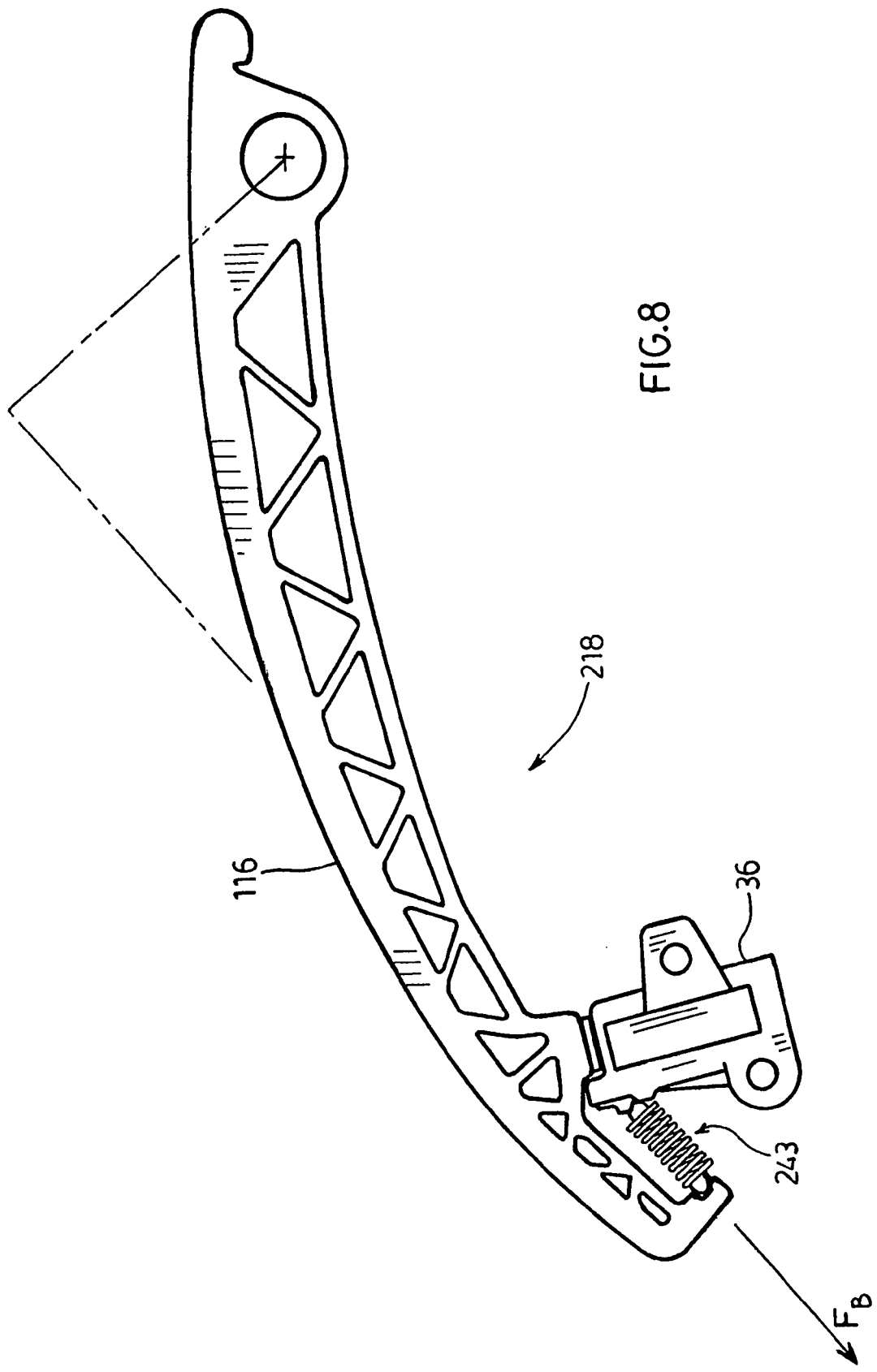
FIG. 8 is plan view of the embodiment of FIG. 7, with the hydraulic actuator in the retracted position.
Figure 9:
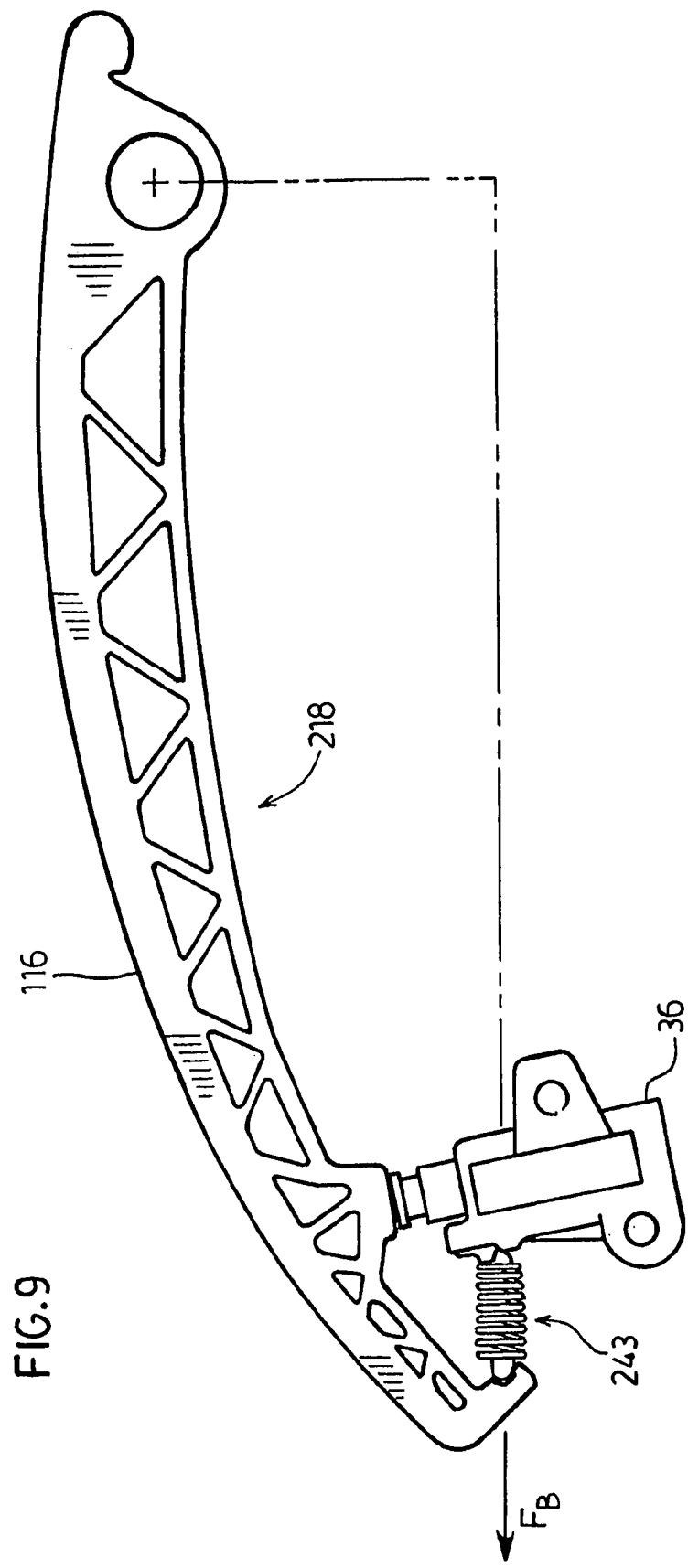
FIG. 9 is a plan view of the embodiment of FIG. 7, with the hydraulic actuator in the extended position.

Referring to FIG. 8, the hydraulic actuator 36 of the tensioner assembly 218 is in the retracted position. In this position, the spring 246 of the biasing assembly 243 is compressed and generates a force FB. However, due to the geometry of the biasing assembly 243, force FB acts in a direction opposed to the force generated by the hydraulic actuator 36 and thus will subtract from the force.

As the piston 34 moves from the retracted position to the extended position, the force FB will change direction to a point where FB will act through the pivot point 30. At this instant, the spring 246 will be compressed to a maximum extent but FB will have no effect on the operation of the tensioner assembly 218. As the piston 34 continues to extend, FB will be directed to act in the same direction relative to the pivot point 30 and will work in conjunction with and add to the force of the hydraulic actuator 36.

The overall effect of the biasing assembly is to present a tensioner assembly where the torque available for tensioning the endless drive element starts at a minimum level and increases as the endless drive element wears and stretches, thereby maintaining a relatively constant tension in the endless drive element.

The above-described embodiments of the invention are intended to be examples of the present invention and alterations and modifications may be effected thereto, by those skilled in the art, without departing from the scope of the invention which is defined solely by the claims appended hereto.

What is claimed is:

1. A tensioner assembly for a drive system, including an endless drive element trained about at least two rotatable members, of an internal combustion engine, said tensioner assembly comprising:
    a hydraulic actuator operatively mountable to said engine, said hydraulic actuator having a piston moveable between retracted and extended positions in response to hydraulic pressure, and a spring urging said piston towards said extended position with a spring force that decreases as said piston moves towards said extended position;
    a guide having a first end pivotally mountable at a pivot point to said engine and a second end distal from said first end, said piston operatively engaging said second end of said guide to exert a torque on said guide to urge said guide into engagement with said endless drive element and maintain tension in said endless drive element; and
    a biasing assembly that engages said guide and applies a biasing assembly force on the guide at a perpendicular distance from the pivot point, wherein a biasing assembly torque is exerted by the biasing assembly on the guide based on the biasing assembly force and said perpendicular distance, wherein movement of said piston towards the extended position causes the biasing assembly to move in such a way that said perpendicular distance changes in such a way as to increase the biasing assembly torque thereby maintaining a generally uniform tension in said endless drive element.

2. A tensioner assembly as set forth in claim 1, wherein said biasing assembly comprises:
    a lever pivotally connected to said guide and engaging with said piston; and
    a cam pivotally mounted, said cam slidingly engaging with said guide, and pivotally engaging with said lever,
    whereby as said piston moves from said retracted position to said extended position, said lever primarily urges said guide in an engaging direction and pivots said cam to secondarily urge said guide in a chain engaging direction.

3. A tensioner assembly as set forth in claim 2, wherein said secondary urging is applied to said guide closer to said second end than where said primary urging is applied to said guide.

4. A tensioner assembly as set forth in claim 3, wherein said cam is pivotally mounted to said hydraulic actuator.

5. A tensioner assembly as set forth in claim 4, wherein said cam is V-shaped having two legs meeting at a vertex.

6. A tensioner assembly as set forth in claim 5, wherein said lever is S-shaped having a bight portion that receives one of said legs of said V-shaped cam providing a pivotal connection therebetween.

7. A tensioner assembly as set forth in claim 6, wherein said vertex slidingly engages with said guide.

8. A tensioner assembly as set forth in claim 7, wherein the other of said legs of said V-shaped cam is pivotally mounted to said hydraulic actuator.

9. A tensioner assembly as set forth in claim 1, wherein said biasing assembly comprises:
  a biasing assembly spring, and
  a cap on each end of said biasing assembly spring, one of said caps pivotally mounting said biasing assembly spring to said second end of said guide.

10. A tensioner assembly as set forth in claim 9, wherein the other of said caps pivotally mounts said biasing assembly spring to said hydraulic actuator.

11. A tensioner assembly as set forth in claim 10, wherein said biasing assembly spring is a compression spring.

12. A tensioner assembly as set forth in claim 11, wherein said guide has a tab at the second end, said tab pivotally receiving one of said caps.

13. A tensioner assembly as set forth in claim 1, wherein said piston is operatively connected to said biasing assembly such that movement of said piston towards the extended position drives the biasing assembly to rotate in such a way as to change the perpendicular distance in such a way as to increase the biasing assembly torque.

14. A tensioner assembly as set forth in claim 13, wherein the biasing assembly is engaged at a fixed point on the guide.

15. A tensioner assembly as set forth in claim 14, wherein the biasing assembly has a first end that is pivotally engaged with the guide and a second end that is pivotally engaged with the hydraulic actuator, and wherein movement of said piston towards the extended position causes a rotation of the biasing assembly about the second end.

16. A tensioner assembly as set forth in claim 15, wherein the biasing assembly includes a biasing assembly compression spring that exerts the biasing assembly force.

17. A tensioner assembly for a drive system, including an endless drive element trained about at least two rotatable members, of an internal combustion engine, said tensioner assembly comprising:
  a hydraulic actuator operatively mountable to said engine, said hydraulic actuator having a piston moveable between retracted and extended positions in response to hydraulic pressure, and a spring urging said piston towards said extended position with a spring force that decreases as said piston moves towards said extended position;
  a guide having a first end pivotally mountable to said engine and a second end distal from said first end, said piston operatively engaging said second end of said guide to torque said guide into engagement with said endless drive element and maintain tension in said endless drive element; and
  a biasing assembly engaging said guide and cooperating with said hydraulic actuator to apply a force to said guide, effecting an increasing torque, as said piston moves towards said extended position thereby maintaining a generally uniform tension in said endless drive element,
  wherein said biasing assembly includes a biasing assembly spring that generates a spring force that initially is directed to act against an actuator force generated by said hydraulic actuator and as said piston moves to said extended position, said biasing assembly spring rotates directing said spring force to act in conjunction with said actuator force.

* * * * *